No. 784,252. PATENTED MAR. 7, 1905.
A. N. DETHLEFSON & H. GRAHN.
LOOSE PULLEY AND BEARING THEREFOR.
APPLICATION FILED FEB. 16, 1904.
2 SHEETS—SHEET 1.
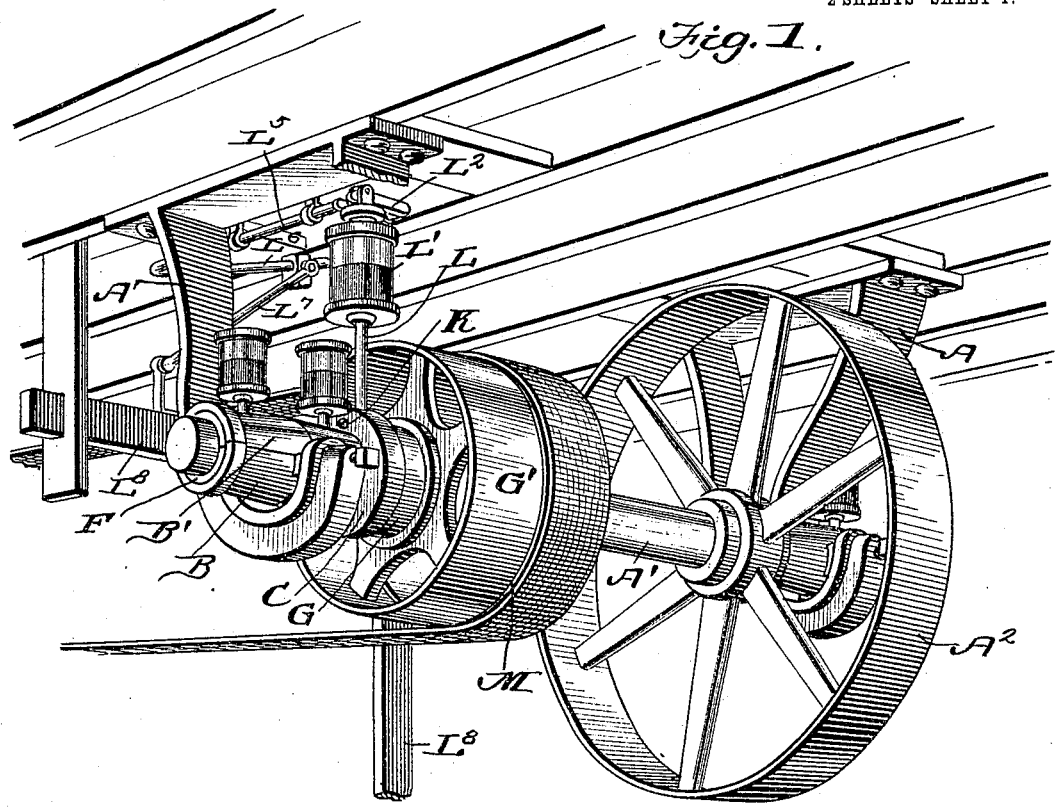
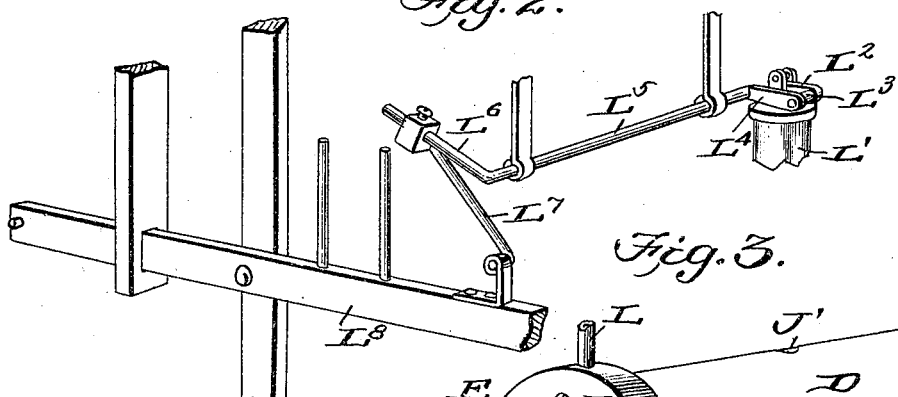
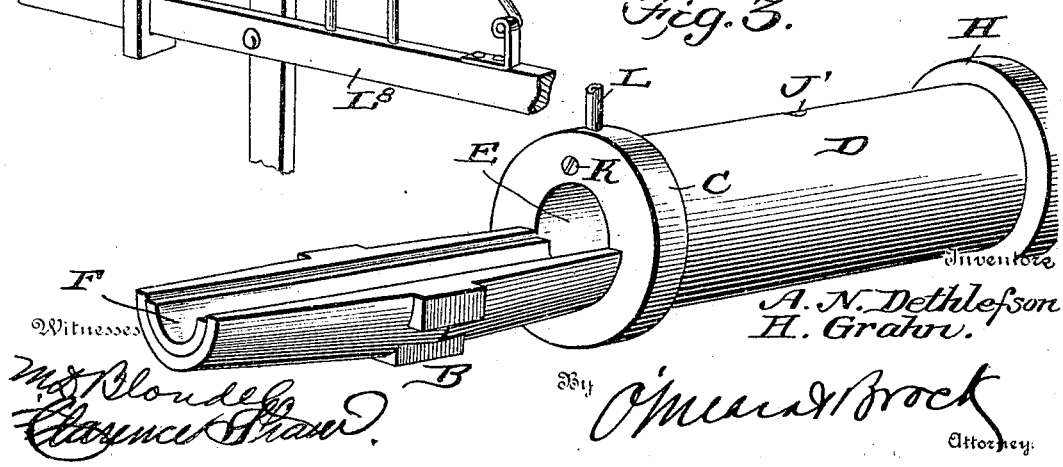

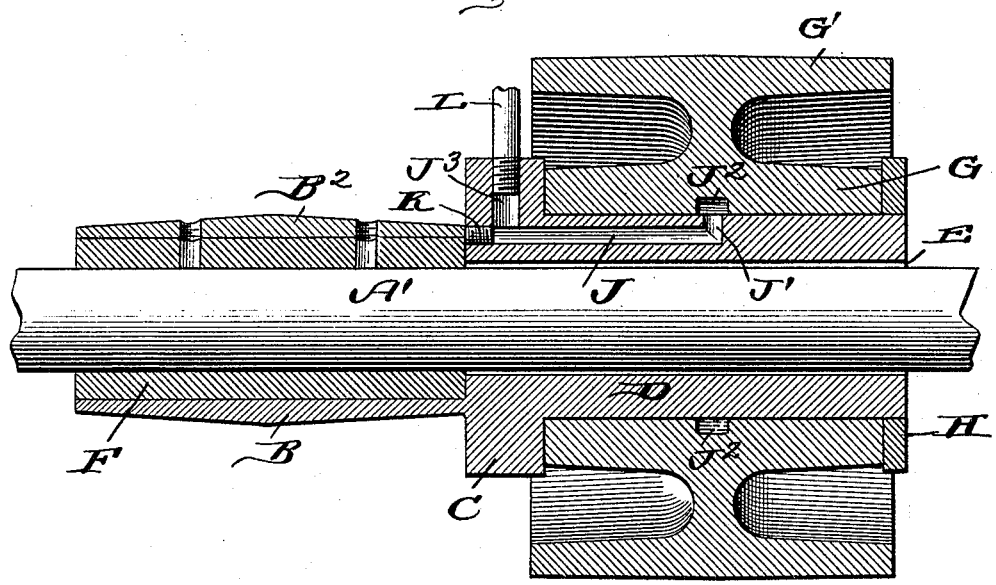
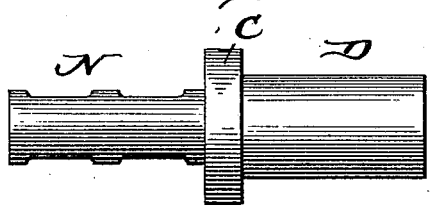
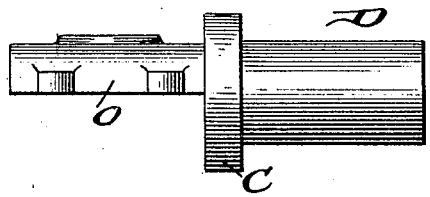

No. 784,252. Patented March 7, 1905.

UNITED STATES PATENT OFFICE.

ANDREW N. DETHLEFSON AND HENRY GRAHN, OF SAN FRANCISCO, CALIFORNIA.

LOOSE PULLEY AND BEARING THEREFOR.

SPECIFICATION forming part of Letters Patent No. 784,252, dated March 7, 1905.

Application filed February 16, 1904. Serial No. 193,825.

*To all whom it may concern:*

Be it known that we, ANDREW N. DETHLEFSON and HENRY GRAHN, citizens of the United States, residing at San Francisco, in the county of San Francisco and State of California, have invented a new and useful Loose Pulley and Bearing Therefor, of which the following is a specification.

Our invention relates to bearings and means for lubricating loose pulleys, the object of our invention being a pulley-bearing and hanger-box cast in one piece and provided with automatic lubricating means, whereby a simple and durable bearing for loose pulleys is formed.

Our invention consists in the novel features of construction and combination of parts hereinafter described, particularly pointed out in the claims, and shown in the accompanying drawings, in which—

Figure 1 is a perspective view showing the practical use of our device and the manner of assembling the various parts. Fig. 2 is a perspective view of the upper portion of the oil-cup and of the belt-shifting device, showing in detail the arrangement of the parts for starting and stopping the flow of oil. Fig. 3 is a perspective view of our improved pulley hanger-box and bearing. Fig. 4 is a longitudinal section through our improved hanger-box, bearing, and pulley, the shaft being shown in elevation. Fig. 5 is a side elevation of a one-piece hanger-box, and Fig. 6 is a slight modification of the form shown in Fig. 3.

In Fig. 1 we have shown the shaft-hangers A and the shaft A', a drive-wheel A² being fixed on the shaft adjacent one end. These parts are shown to more clearly bring out the use of our improvement. Referring, therefore, more particularly to Figs. 3 and 4, B represents the lower half of the hanger-box, which is cast integral with the collar C and bearings D. Over the box B fits a removable cap or supplemental half B'. (Shown in position in Fig. 1.) The bore of the hanger-boxing is of greater diameter than that of the collar C and bearing D, the bore E being continuous through the two latter and of the same diameter at all points. In practice we cut the bore E or otherwise form it so that it will be slightly greater than the diameter of the shaft A', with which it is to be used. The hanger-box is then babbitted, as shown at F in Figs. 3 and 4, to fit the shaft, whereby the diameter of the bore formed through the babbitted portion is of less diameter than the bore E. The enlargement of the bore E prevents the bearing D from coming into close contact with the shaft A' and thus prevents an undue and unnecessary amount of friction.

The loose pulley comprises the hub portion G and the crown G', the latter having a slightly greater width than the hub portion, which latter bears at one side against the collar C and on the other side against a collar H, fitted on the bearing D and holding the pulley in place. In order to lubricate this pulley, we form a longitudinal bore J in the upper portion of the bearing D, extending from midway the ends of the bearing to and through the collar. At its inner end this bore communicates with a vertical bore J', opening upwardly under the center of the pulley and alining with a central annular groove J², formed on the inner face of the bore of the hub G. In the collar C is formed a vertical bore J³, which communicates at its lower end with the bore J at a point adjacent the outer end of the last-mentioned bore, the extreme end of which is closed by the plug K, which is threaded into it before the upper portion of the boxing B' is placed in position. The lower end of the pipe L from the oil-cup L' is threaded into and opens downwardly into the bore J³.

The oil-cup L' is of a common and well-known construction, and downward pressure on the upper portion of the valve controlling the flow of oil from said cup in order to cut off the flow is automatically effected as follows: A cam-lever L² is pivoted between suitable lugs on the cup, one end of the lever being connected by a pin L³ to a crank-arm L⁴, parallel with the lever and rigid on the end of a rock-shaft L⁵. This shaft has a cranked portion L⁶, to which is connected a link L⁷, hinged to the usual form of belt-shifter L⁸. When the belt is shifted to the loose pulley G, the shaft is rocked so as to lift the pivoted end of the lever and open the valve, allowing the oil to flow through the pipe L. When, however, the belt is shifted to the tight pulley M, the pivoted end of the lever is depressed and the flow of oil is cut off. It is obvious, therefore, that oil is only fed to the loose pulley when the latter is rotating and that when the pulley is stationary and not in need of lubrication the flow of oil will be cut off.

The form of hanger-box previously described is of the split-hanger-box type; but in Fig. 5 we have shown a solid hanger-box for side adjustable open hangers, the construction being otherwise similar to that shown and described in connection with the split hanger-box. In Fig. 6 is shown a slight modification forming a machine cap-box. In Fig. 5 the box is designated N, and in Fig. 6 the upper integral half of the box is indicated at O, the remaining parts—that is, the collar C and bearings D—being exactly the same as the like parts shown in Fig. 4 and heretofore described.

It will be obvious from the above and from the drawings that we have a simple, durable, and efficient method of combining the hanger or machine box with the loose pulley-bearings and a pulley especially adapted to work on said bearings, as well as convenient means for lubricating the pulley.

Having thus fully described our invention, what we claim as new, and desire to secure by Letters Patent, is—

1. The combination with a hanger-box, an integral collar formed at one end of the box, a pulley-bearing integral with the collar and on the side opposite the box, the said collar and bearing having a continuous bore greater in diameter than the diameter of the shaft for which the hanger-box is adapted, the said collar and bearing having a bore formed therein adapted to convey oil to the periphery of the bearing, a pulley mounted thereon, the bore of the hub portion of said pulley having an annular groove adapted to register with the inner end of the oil-conveying bore of the collar, means for feeding oil to said bore when the pulley is rotating and means for cutting the supply of oil off when the pulley is stationary.

2. A device of the kind described comprising a sectional hanger-box, one-half of said box being formed integral with an end collar, a loose pulley-bearing formed integral with the said collar, the said hanger-box being babbitted to fit a shaft, the said bearing and collar having a bore of greater diameter than the shaft, a pulley mounted loosely on said bearing and having a hub portion the width of which is less than the length of the bearing, the said hub fitting on one side against one side of the collar, a supplemental collar arranged on the opposite end of the bearing and adapted to hold the pulley in place, the said pulley having an annular groove formed in the bore of its hub portion, the bearings and integral collar having a bore opening at one end on the periphery of the bearing and adapted to register with the groove in the hub portion of the pulley, and means for feeding oil into said bore.

A. N. DETHLEFSON.
HENRY GRAHN.

Witnesses:
A. J. HENRY,
WILLIAM FROGNER.